March 10, 1953 A. FINLAY 2,631,275
TRANSMITTER FOR CODED CARRIER CONTROL SYSTEMS
Filed June 26, 1951
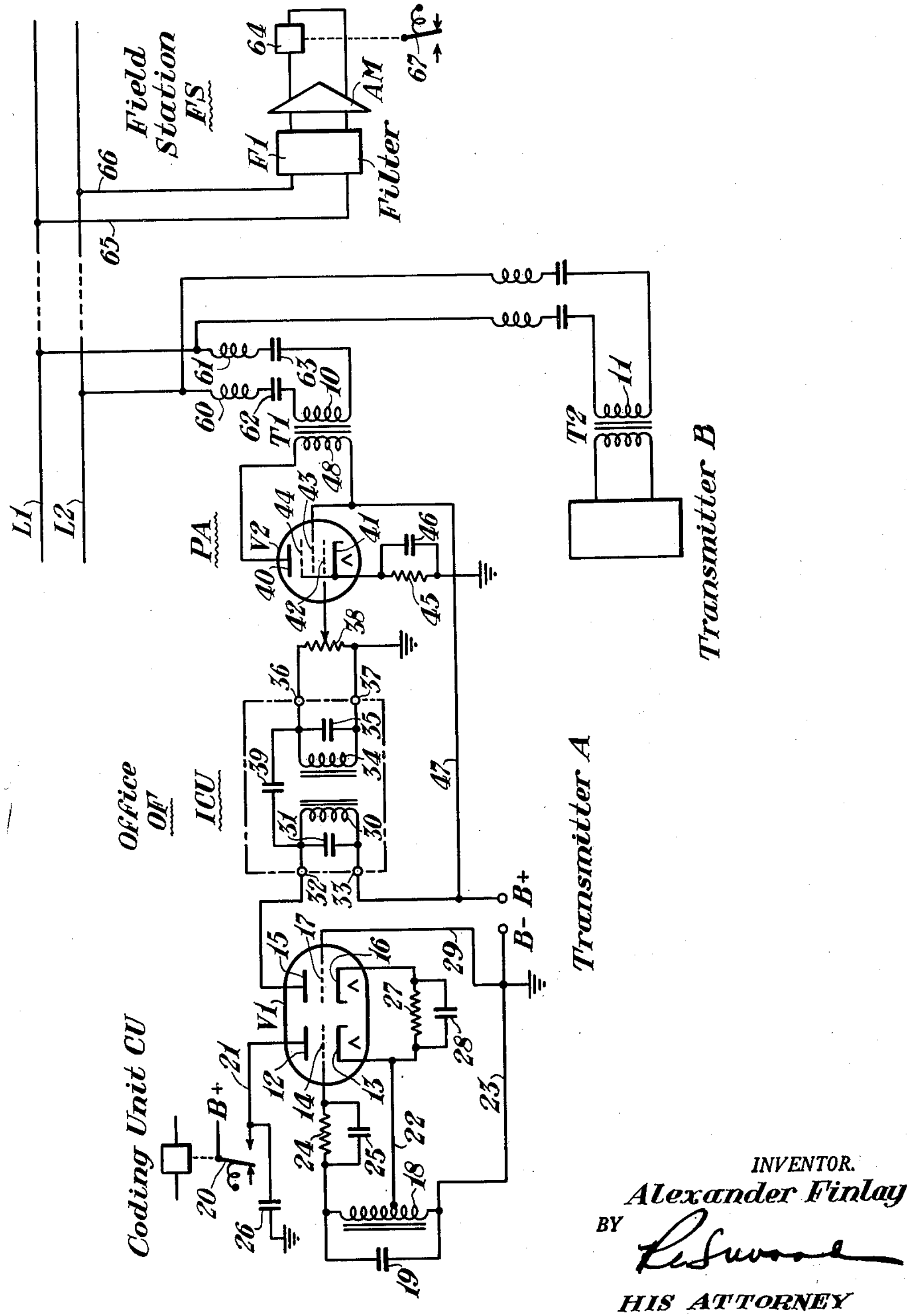
INVENTOR.
Alexander Finlay
BY
HIS ATTORNEY Patented Mar. 10, 1953 2,631,275

UNITED STATES PATENT OFFICE 2,631,275

TRANSMITTER FOR CODED CARRIER CONTROL SYSTEMS

Alexander Finlay, Swissvale, Pa., assignor to Westinghouse Air Brake Company, Wilmerding, Pa., a corporation of Pennsylvania Application June 26, 1951, Serial No. 233,626

3 Claims. (Cl. 340—345)

My invention relates to transmitters for coded carrier control systems.

In many control systems it is desirable to use a single transmitting circuit or medium for the transmission of a plurality of different control signals. Furthermore, these control signals are often selectively directed to different locations spaced along the transmitting circuit with each location requiring a plurality of different controls. It has been proposed to use in such a control system a plurality of different carrier currents with each current providing a signaling channel and over each channel of which a plurality of different signals are transmitted by coding the carrier. In these control systems it is desirable that the channels be closely spaced as to the carrier frequency in order to confine the entire system to a relatively narrow band of carrier frequencies.

Also, in these control systems the different controls for each channel are frequently provided by the corresponding carrier being interrupted according to a designated code, the code consisting of spaced pulses of the carrier current. That is to say, the carrier is coded by interrupting the carrier at a designated code pattern. In other words, these control systems may be of the time code type.

When a control signal is provided by interrupting a carrier, the control signal supplied to the transmitting circuit has a wave form which corresponds to the carrier frequency amplitude modulated by the code frequency. This causes the energy supplied to the transmitting circuit or medium to contain the fundamental frequency of the carrier and side-band frequency components which are equal to the carrier frequency plus or minus $n$ times the coding frequency where $n$ is any integer.

These side-bands, and especially the higher order of the side-band components, may cause serious adjacent channel interference where closely spaced channels and a common transmitting medium are used.

Accordingly, it is an object of my invention to provide an improved transmitter for a coded carrier control system where the carrier is coded by being interrupted according to a code pattern.

Another object of my invention is the provision of a coded carrier transmitter incorporating novel means for shaping the wave form of the coded energy supplied by the transmitter.

A further object of my invention is the provision of improved means for keeping the oscillator of a code transmitter to produce a square top coded wave and also to provide improved means for removing from the wave the unwanted side-band frequency components which may cause adjacent channel interference.

Other objects, features and advantages of my invention will appear as the specification progresses.

To accomplish the foregoing objects, features and advantages of my invention I provide a vacuum tube oscillator which is keyed by coding means interposed in the anode circuit of the oscillator tube and which coding means is operative to interrupt the anode power supply in accordance with any one of a plurality of different code patterns. Thus the output of the oscillator has a wave form which is the carrier amplitude modulated by a square top wave. Preferably, I provide a buffer amplifier the input electrodes of which are coupled to the oscillator through a unit interposed in the cathode circuit of the oscillator tube. Furthermore, the buffer amplifier stage is arranged preferably as a grounded grid amplifier. I also provide an interstage coupling unit and a power amplifier the input electrodes of which are coupled to the buffer amplifier output electrodes through the coupling unit. This interstage coupling unit is constructed and proportioned to remove all side-band components that are unwanted in the coded signal energy supplied by the transmitter to the transmitting medium. That is to say, this coupling unit is characterized to pass a selected band of the side-band frequency components along with the carrier frequency and the remaining side-band components are suppressed. The band of side-band frequency components passed is selected so that a satisfactory code signal is provided. The output of the terminals of this coupling unit are connected to the input electrodes of the power amplifier and the output electrodes of the power amplifier are in turn coupled to the transmitting circuit.

In this way there is supplied to the transmitting circuit code pulses of the carrier and which pulses contain the fundamental frequency of the carrier and side-band components of a sufficient width to provide a satisfactory code pulse of the current, while the side-band components that are likely to cause adjacent interference are substantially suppressed.

I shall describe a preferred form of a coded carrier transmitter embodying my invention and shall then point out the novel features thereof in claims.

The accompanying drawing is a schematic diagram showing a preferred construction of a coded carrier transmitter embodying my invention when used with a time code type of control system.

Referring to the drawing, the reference characters L1 and L2 designate a pair of line wires extending between an office OF and a plurality of spaced field stations of which only the one field station FS is illustrated because this one station is sufficient for an understanding of my invention. These line wires L1 and L2 provide a transmitting circuit between the office and the field stations and by which circuit different code control signals are transmitted from the office to the different stations. It is to be understood that while the transmitting circuit or medium is here illustrated as comprising a physical pair of wires, the transmitting medium may take other forms and it may be a radio link extending between the office and the field stations. Furthermore, it is clear that this transmitting circuit is capable of being used as a common medium for the transmitting of a plurality of carriers of different frequencies with each carrier providing an individual signaling channel and each of which channels is capable of providing a plurality of different code signals by code interrupting the carrier of the corresponding channel.

The office OF is provided that a plurality of transmitters, one for each signaling channel of the system. As illustrated in the drawing, two transmitters A and B are provided, these transmitters being constructed according to my invention. Only the structure of the transmitter A is illustrated in the drawing, the transmitter B being shown in a conventional manner because its construction would be a duplication of that of transmitter A except for the tuning of the different parts. By way of illustration, I shall assume that the transmitter A supplies a carrier of the frequency $f1$ and the transmitter B supplies a carrier of the frequency $f2$. The outputs of these two transmitters A and B are connected to the transmitting circuit in multiple. The output of the transmitter A includes a transformer T1, a secondary winding 10 of which is connected across the line wires L1 and L2 through a series tuned filter, an inductor 60 and a capacitor 62 in series being interposed in the lead from the secondary winding 10 to the line wires L2, and an inductor 61 and a capacitor 63 in series being interposed in the lead from the secondary winding 10 to the line wire L1. Similarly, the transformer T2 of the transmitter B is connected across the line wires L1 and L2 through a filter including inductance and capacitance. By this parallel connection as here illustrated, the secondary winding 10 is made to present a relatively large impedance for all carrier frequencies except the frequency supplied by the transmitter A, and in a similar manner the secondary winding 11 of the output transformer T2 of the transmitter B presents a relatively high impedance for all carrier frequencies except the carrier supplied by the transmitter B.

Referring to the transmitter A, this transmitter includes a twin triode vacuum tube V1, the left-hand section of which as viewed in the drawing is used as the electron tube of an oscillator and the right-hand section of which tube V1 is used as a buffer amplifier stage. It is to be understood that other types of electron tubes can be used. Specifically, the left-hand section of tube V1 is provided with an anode 12, a cathode 13, and a control grid or electrode 14, and the right-hand section of the tube is provided with an anode 15, a cathode 16 and a control electrode 17.

The office OF is provided with a suitable power source for supplying power to the different tubes of the transmitter. As here shown, a high voltage direct current source is identified by the terminals B+ and B−, the terminal B− being connected to ground in the manner customarily employed in transmitters of this type. A low voltage source is also provided for heating the different tubes but this low voltage source and the associated heating circuits are not shown in the drawing in order to simplify the drawing because these circuits would be in accordance with standard practice and they form no part of my present invention.

The oscillator section of the tube V1 is provided with a tuned oscillatory circuit comprising an inductor winding 18 and a capacitor 19, these two elements being tuned to resonance at the carrier frequency of the transmitter, and which I have here assumed as being a carrier frequency $f1$. This oscillator tube is provided with an anode circuit that can be traced from terminal B+ of the power source through a normally open contact 20 of a coding unit CU to be referred to shortly, wire 21, anode 12 and tube space to cathode 13, wire 22 to a selected intermediate terminal of the inductor winding 18, the lower portion of winding 18 and wire 23 to the terminal B− of the power source. The oscillator tube is also provided with a control circuit extending from the control electrode 14 through a unit comprising a resistor 24 and a capacitor 25 in multiple, the upper portion of the inductor winding 18 to its intermediate terminal and wire 22 to the cathode 13. It is clear that when the contact 20 of the coding unit CU is closed and the power source is connected across the anode 12 and the cathode 13 of the oscillator tube, the oscillator is energized and its carrier frequency $f1$ is generated. In other words, the oscillator is keyed by the coding unit CU which is operable to close its contact 20 at selected intervals, the carrier being supplied when the contact 20 is closed and the carrier being interrupted when the contact 20 is open. It follows that code pulses of the carrier energy are supplied by the oscillator in accordance with the code operation of the contact 20 by the coding unit CU.

The coding unit CU may be of different forms and as here shown it is a direct current polar relay type having its contact 20 spring biased to an open position and operated to a closed position when the relay is energized by current of a given polarity. The means for operating the coding unit CU is not shown because the specific structure of this portion of the apparatus forms no part of my invention and it may be any one of several well-known arrangements for operating a coding device. Preferably, a capacitor 26 is connected between the contact 20 and ground to improve the operation of the coding unit. It is clear from the foregoing that the coding unit and the oscillator are operable to supply coded carrier which corresponds to the carrier amplitude modulated according to the code frequency of the coding contact 20. Consequently, the energy output of the oscillator will have a wave form that comprises the fundamental frequency of the oscillator and side-band frequency components which have a frequency corresponding to the carrier frequency plus or minus $n$ times the coding frequency where $n$ is any integer.

The buffer amplifier, that is, the right-hand section of the tube V1 is arranged as a grounded grid amplifier which is coupled to the oscillator tube through the cathode circuit of the amplifier. Specifically, the grid 17 of the buffer amplifier is connected to ground by wire 29 and its cathode 16 is connected to the cathode 13 of the oscillator tube through a unit consisting of a resistor 27 and a capacitor 28 in multiple. The anode 15 of the buffer amplifier is connected to the positive terminal B+ of the power source through input terminals of an interstage coupling unit ICU to be described shortly. Thus, the code pulses of the carrier resulting from operation of the coding unit CU will be reproduced in the anode circuit of the buffer amplifier at an energy level increased by the amplification of the buffer amplifier tube. It is clear, however, that the coded energy in the output of the buffer tube will have a wave form that corresponds to the wave form of the energy supplied by the oscillator.

The interstage coupling ICU includes a pair of symmetrical tuned circuits. Specifically, a first tuned circuit includes an iron core inductor winding 30 and a capacitor 31 connected in multiple across the input terminals 32 and 33 of the unit, and to which input terminals the anode circuit of the buffer stage amplifier is connected as explained hereinbefore. A second tuned circuit of the unit ICU comprises an iron core inductor winding 34 and a capacitor 35 connected in multiple to output terminals 36 and 37 of the unit, and across which output terminals a load resistor 38 is connected. The tuned circuits of the unit ICU are coupled by a capacitor 39, there being, however, a certain amount of inductive coupling between the two windings 30 and 34. It is to be pointed out that these two tuned circuits can be disposed for inductive coupling only or for capacitive coupling only or for both inductive and capacitive coupling.

The parts of the coupling unit ICU are constructed and proportioned for the unit to have a relatively flat band pass characteristic which is wide enough to permit a steep rise in carrier voltage. Also, the unit is characterized so that a high attenuation is provided for frequencies outside of a selected band to suppress these non-selected frequency components of the energy. Preferably, the unit is characterized to suppress the higher order of the side-band frequency components of the coded carrier energy. That is to say, the unit ICU is constructed and characterized to pass the fundamental frequency of the carrier and a selected band of the side-band frequency components and to suppress the side-band frequency components outside of the selected band.

It is to be pointed out that this interstage coupling unit ICU could take other forms, but the construction here shown is the preferred arrangement. My invention, however, contemplates this unit to be constructed in any acceptable manner that will provide the above operating characteristics.

A power amplifier PA is provided for amplifying the energy passed by the unit ICU and to supply the energy to the transmitting circuit L1—L2. As here illustrated the power amplifier PA includes a pentode V2 having an anode 40, a cathode 41, a control grid 42 and two additional grids 43 and 44, the grid 44 being connected to the cathode 41 inside the tube. It will be understood, however, that other forms of tubes can be used. The tube V2 is provided with an input circuit by connecting its control grid 42 to a selected intermediate terminal of the load resistance 38 of the coupling unit ICU and connecting the cathode 41 to ground through a biasing unit consisting of a resistor 45 and a capacitor 46 in multiple, it being observed that the lower terminal of the load resistor 38 is connected to ground. The output or anode circuit for the power tube V2 extends from the power terminal B+ through wire 47, primary winding 48 of the transformer T1, anode 40 and tube space to cathode 41 and the biasing unit 45—46 to ground. The grid 43 is preferably connected to the positive terminal of the power source. As explained hereinbefore, the secondary winding 10 of the transformer T1 is connected to the transmitting circuit and consequently the coded carrier energy passed by the unit ICU is applied to the power amplifier PA and thence supplied to the transmitting circuit at a relatively high energy level, the wave form of the coded current supplied to the transmitting circuit corresponding to that passed to the output of the unit ICU.

The field station FS shown at the right-hand end of the drawing, is provided with receiving apparatus that includes a filter F1, amplifier decoding means AM, and a code following relay 64, and which receiving means is connected across the line circuit through lead wires 65 and 66. This receiving apparatus for the field station FS may take different forms and it is shown in a conventional manner only because its specific form is no part of my present invention and it may be any one of several arrangements well-known in the art. It is sufficient for this application to point out that this receiving apparatus is made selectively responsive to the carrier provided by the transmitter A and when coded carrier current is applied at the office OF by the transmitter A in the manner described hereinbefore, this coded energy is received at the station FS and decoded and the code following relay 64 is made to operate its contact 67 in step with the code operation of the contact 20 of the coding unit CU at the office.

A coded carrier transmitter here provided has the advantages that code distortion caused by the transmitter itself is largely eliminated. The transmitter can be used for systems having a high code speed and also for systems using a low code speed. The code pulses are shaped so as to minimize adjacent channel interference and yet pass a band of frequencies sufficient to assure reliable reception at the receiving station. Furthermore, the construction of the code transmitter here provided is relatively simple and inexpensive.

Although I have herein shown and described but one form of transmitter for coded carrier control systems embodying my invention, it is to be understood that various changes and modifications may be made therein within the scope of the appended claims without departing from the spirit and scope of my invention.

Having thus described my invention, what I claim is:

1. A coded carrier transmitter comprising in combination, an oscillator including a tuned circuit and an electron tube having an anode, a cathode and a control electrode; said oscillator operable to supply a carrier of a selected frequency when power is applied across the anode and cathode of its tube, coding means having a contact which is operable to an open and a closed position at selected code rates, a power source, said power source being connected across the anode and cathode of said tube through said contact to power the oscillator to supply pulses of the carrier having a code rate corresponding to the selected rate of operation of said contact, said coded carrier having a wave form which includes said carrier frequency and side-band frequency components of the carrier amplitude modulated at said code rate frequency, a buffer amplifier tube having input and output electrodes, means for electrically coupling said buffer tube input electrodes to the anode-cathode circuit of said oscillator tube, a coupling unit including a pair of tuned circuits and having input and output terminals, said tuned circuits of said unit being electrically coupled and constructed to pass only said carrier frequency and a selected band of said side-band components of the coded carrier, said tuned circuits being effective to suppress the side-band components outside of said selected band, said buffer amplifier having its output electrodes connected to said input terminals of the coupling unit, a power amplifier tube having input and output electrodes and having its input electrodes coupled to the output terminals of said unit, and sending circuit means connected to the output electrodes of said power amplifier tube.

2. A coded carrier transmitter comprising in combination, an oscillator including a tuned circuit and an electron tube having an anode, a cathode and a control electrode; said oscillator operable to supply a carrier of a selected frequency when power is applied across the anode and cathode of its tube, coding means having a contact which is operable to an open and a closed position at selected code rates, a power source, an anode circuit including said contact and said power source connected across the anode and cathode of said oscillator tube, said oscillator being effective when thus energized to supply said carrier coded at the selected code rate of operation of said contact, said coded carrier having a wave form containing the fundamental carrier frequency and side-band frequency components equal to the carrier frequency plus or minus $n$ times the coding frequency where $n$ is any integer, a buffer amplifier tube having input and output electrodes, said buffer tube input electrodes being electrically coupled to the cathode of said oscillator tube, a coupling unit including electrically coupled tuned circuits and having input and output terminals, said buffer tube output electrodes being connected to said input terminals of said unit, said tuned circuits having a construction to characterize the unit to substantially suppress the higher side-band frequency components of the coded carrier and to pass the fundamental carrier frequency and selected lower side-band components, a power amplifier tube having input and output electrodes, circuit means to electrically couple the output terminals of said unit to said input electrodes of said power amplifier tube, another pair of output terminals, and means to electrically couple said output electrodes of said power amplifier tube to said another pair of output terminals.

3. In combination, an oscillator including an oscillatory circuit and an electron tube having an anode, a cathode and a control electrode; said oscillator operable to supply a carrier of a selected frequency when energized, a power source effective to energize the oscillator, a coding contact operable to an open and a closed position at a selected code rate, an anode-cathode circuit including said power source and said contact connected to said anode and cathode of said oscillator tube to energize said oscillator at said code rate to supply pulses of said carrier, said carrier pulses containing the fundamental carrier frequency and side-band frequency components due to the amplitude modulation of the carrier by said code frequency, a buffer amplifier tube having input and output electrodes, means including a coupling element to connect the input electrode of the buffer amplifier to the cathode of said oscillator tube, a coupling unit including two symmetrically tuned circuits, each said tuned circuit including inductance and capacitance, said tuned circuits being coupled by a capacitor connected to each of the circuits, said coupling unit characterized by suppressing a selected band of said side-band components and passing the carrier and the nonselected side-band components, said unit having input and output terminals, said output electrodes of said buffer amplifier having connection to said input terminals of said unit, a load resistor connected to said output terminals of said unit, a power amplifier having input and output electrodes, said input electrodes of said power amplifier having connection to said load resistor, a transmitting circuit, and circuit means including a transformer to connect said power amplifier output electrodes to said transmitting circuit.

ALEXANDER FINLAY.

REFERENCES CITED

The following references are of record in the file of this patent:

UNITED STATES PATENTS

| Number | Name | Date |
|---|---|---|
| 1,836,441 | Burkholder | Dec. 15, 1931 |
| 2,229,029 | Wassell | June 21, 1941 |

FOREIGN PATENTS

| Number | Country | Date |
|---|---|---|
| 404,382 | Great Britain | Jan. 18, 1934 |